(12) United States Patent
Devanneaux et al.

(10) Patent No.: US 10,171,605 B2
(45) Date of Patent: Jan. 1, 2019

(54) DUAL CHANNEL DELIVERY

(71) Applicant: Apple Inc., Cupertino, CA (US)

(72) Inventors: Thomas P. Devanneaux, Los Altos, CA (US); Nicholas J. Circosta, Mountain View, CA (US); Daniel B. Pollack, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/418,923

(22) Filed: Jan. 30, 2017

(65) Prior Publication Data

US 2018/0020068 A1 Jan. 18, 2018

Related U.S. Application Data (60) Provisional application No. 62/363,171, filed on Jul. 15, 2016.

(51) Int. Cl.
*H04L 29/08* (2006.01)
*H04L 12/24* (2006.01)
*H04W 68/02* (2009.01)

(52) U.S. Cl.
CPC .......... *H04L 67/26* (2013.01); *H04L 41/0668* (2013.01); *H04L 41/0686* (2013.01); *H04L 67/02* (2013.01); *H04L 67/107* (2013.01); *H04L 67/1068* (2013.01); *H04L 67/16* (2013.01); *H04W 68/02* (2013.01)

(58) Field of Classification Search
CPC ..... H04L 67/26; H04L 67/16; H04L 41/0668; H04L 41/0686; H04L 67/107; H04L 67/1068; H04L 67/02; H04W 68/02
See application file for complete search history.

(56) References Cited

U.S. PATENT DOCUMENTS

| | | | |
|---|---|---|---|
| 6,151,676 A | 11/2000 | Cuccia et al. | |
| 8,526,455 B2 | 9/2013 | Vyrros et al. | |
| 8,942,115 B2 | 1/2015 | Vyrros et al. | |
| 2004/0176036 A1* | 9/2004 | Mimoto | G06K 7/0008 455/63.1 |
| 2010/0083029 A1* | 4/2010 | Erickson | G06F 11/0709 714/2 |
| 2010/0176930 A1* | 7/2010 | Shiotsu | G06K 7/10475 340/10.4 |
| 2014/0282994 A1* | 9/2014 | Dietrich | G06F 21/34 726/9 |

(Continued)

*Primary Examiner* — Joseph Dean, Jr.
(74) *Attorney, Agent, or Firm* — Meyertons Hood Kivlin Kowert & Goetzel, P.C.; Jeffrey C. Hood; Brian E. Moore (57) ABSTRACT

Embodiments described herein relate to systems and methods for transmitting service related messages, e.g., via a reverse push connection. In some embodiments, a UE may be configured to receive a random value from a server, the random value based at least in part on a capacity of the server and/or network. The UE may be configured to compare the random value to a generated value, and determine, based at least in part on the comparison, to transmit a service related message over a reverse push connection rather than via a hypertext transport protocol (HTTP) request. In some embodiments, the service related message may be any message that relates to a service available between devices, such as an identity (ID) query request, a service (de-) registration request, and/or a device listing request, among other types of messages.

20 Claims, 5 Drawing Sheets

(56) References Cited

U.S. PATENT DOCUMENTS

| | | | |
|---|---|---|---|
| 2014/0317233 A1* | 10/2014 | Ohnishi | G06Q 30/06 709/217 |
| 2015/0081906 A1* | 3/2015 | Backholm | H04W 74/06 709/225 |
| 2015/0212674 A1 | 7/2015 | Firstenberg et al. | |
| 2015/0350362 A1 | 12/2015 | Pollack et al. | |
| 2016/0337290 A1 | 11/2016 | Li et al. | |

* cited by examiner

DUAL CHANNEL DELIVERY

PRIORITY DATA

This application claims benefit of priority to U.S. Provisional Application Ser. No. 62/363,171, titled "Dual Channel Delivery", filed Jul. 15, 2016, by Thomas P. Devanneaux, Nicholas J. Circosta, and Daniel B. Pollack, which is hereby incorporated by reference in its entirety as though fully and completely set forth herein.

TECHNICAL FIELD

The present application relates to transmission of service related messages, including transmitting service related messages via reverse push notification.

DESCRIPTION OF THE RELATED ART

Communications (e.g., text, audio, and video) between users via personal and/or mobile computing devices are rapidly growing in usage. For example, IP-based telecommunications services (e.g., such as Messages™ and FaceTime™ from Apple Inc.) are becoming increasingly common using both wired and wireless media.

However, usage of such IP-based telecommunications services requires knowledge of other devices supporting similar services. Thus, identity queries have been implemented in most networks to determine capabilities of devices. However, most queries are currently performed via hypertext transport protocol (HTTP) requests, which may be time inefficient and unreliable leading to negative impacts on user experience.

SUMMARY

Embodiments described herein relate to systems and methods for transmitting service related messages via a reverse push connection.

Embodiments relate to a user equipment device (UE) that includes at least one antenna, at least one radio, and one or more processors in communication with (directly or indirectly) the at least one radio. The at least one radio is configured to perform cellular communication using at least one radio access technology (RAT). The one or more processors and the at least one radio are configured to perform voice and/or data communications.

In some embodiments, the UE may be configured to receive a random value from a server, compare the random value to a generated value, and determine, based at least in part on the comparison, to transmit a service related message over a reverse push connection rather than via a hypertext transport protocol (HTTP) request. In some embodiments, the message may be one of an identity (ID) query request, a registration or de-registration request for a service supported by the server, and/or a device listing request related to user ID. In some embodiments, the UE may be further configured to initiate a timer upon transmission of the service related message and upon expiration of the timer, transmit the service related message via the HTTP request.

In some embodiments, the UE may be configured to transmit a service related message to a server over a reverse push connection rather than via a HTTP request and may receive an indication of an error from a sever. In some embodiments, the service related message may be an ID query request, wherein the ID request is in regards to another UE. In some embodiments, the service related message may be a request to register a device for, or de-register a device from, a service supported by the server. In some embodiments, the service related message may be a device listing request that queries the server for a list of devices currently signed in to the service for a particular user ID. In still other embodiments, the service related message may correspond to one or more other types of messages relating to, e.g., services, notifications, alerts, and so forth. In response to the error indication, the UE may be configured to transmit the service related message via the HTTP request.

Some embodiments relate to a server that includes a network interface and a processing element coupled (directly or indirectly) to the network interface. In some embodiments, the server may be configured to determine a capacity for service related requests from one or more UEs over one or more respective push notification connections and can generate a random value (and in some implementations a percent range associated with the random value), wherein the percent range is based at least in part on the capacity of the server and/or network to support service related requests. The server may be configured to transmit the random value and/or percent range to the one or more UEs, receive, from a first subset of the one or more UEs, service related requests via an HTTP request, and receive, from a second subset of the one or more UEs, service related requests via the push notification connection. In some embodiments, the service related requests may be an ID query request or a registration request for a service supported by the server, a de-registration request from a service supported by the server, and/or a listing request related to a user ID. In still other embodiments, the service related message may correspond to one or more other types of messages relating to, e.g., services, notifications, alerts, and so forth.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents, and alternatives falling within the spirit and scope of the appended claims.

DETAILED DESCRIPTION OF THE EMBODIMENTS

Acronyms

The following acronyms are used in the present disclosure.
ICE: Interactive Connectivity Establishment
LTE: Long Term Evolution
NAT: Network Address Translation
RAT: Radio Access Technology
RX: Receive
STUN: Session Traversal Utilities for NAT
TURN: Traversal Using Relay NAT
TX: Transmit
WLAN: Wireless Local Area Network

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using cellular communication and/or WLAN communication. Examples of mobile devices include mobile telephones or smart phones (e.g., iPhone™, Android™-based phones), and tablet computers such as iPad, Samsung Galaxy, etc. Various other types of devices would fall into this category if they include both cellular and Wi-Fi communication capabilities, such as laptop computers (e.g., MacBook), portable gaming devices (e.g., Nintendo DS™, PlayStation Portable™, Gameboy Advance™, iPhone™), portable Internet devices, and other handheld devices, as well as wearable devices such as wrist-watches, headphones, pendants, earpieces, etc. In general, the term "mobile device" can be broadly defined to encompass any electronic, computing, and/or telecommunications device (or combination of devices) which is easily transported by a user and capable of wireless communication using WLAN and/or cellular communication.

Communication Device—any of various types of computer systems that perform wireless or wired personal communications, such as real time audio or video communications. Examples of communication devices include mobile devices as defined above, as well as stationary personal computing devices such as desktop computers that are capable of performing personal communications.

Cellular—The term "cellular" has the full breadth of its ordinary meaning, and at least includes a wireless communication network or RAT distributed over land areas called "cells" and is used by virtually all mobile telephones today.

Cellular RAT—The term "cellular RAT" has the full breadth of its ordinary meaning, and at least includes any of the present or future radio access technologies used to communication on a cellular network, such as Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced, and other similar or future cellular RATs, including 3G, 4G, 5G, 6G, etc., cellular RATs.

Cellular Base Station—The term "Cellular Base Station" has the full breadth of its ordinary meaning, and at least includes a wireless cellular communication station installed at a fixed location and used to communicate as part of a cellular network or cellular radio access technology (RAT).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1A:
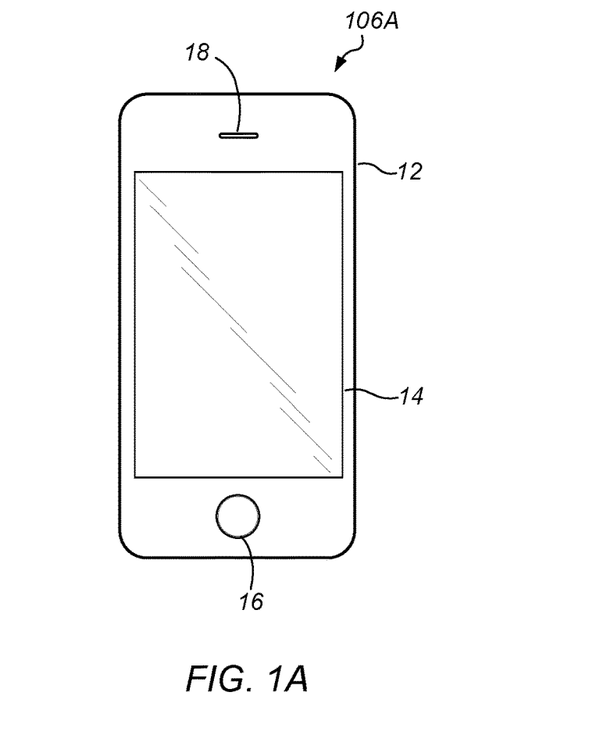
FIGS. 1A and 1B illustrates example communication devices, according to some embodiments.
Figure 1B:
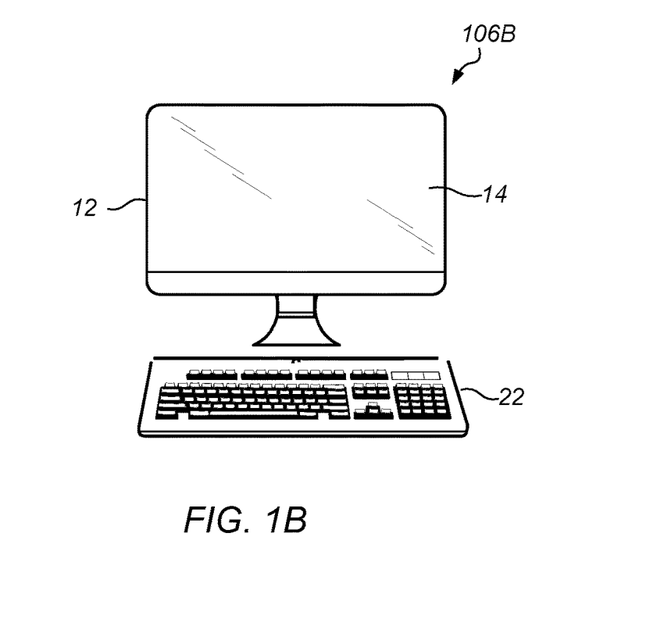

FIGS. 1A and 1B—Communication Device

FIG. 1A illustrates an example communication device 106A, in this case a telephone device, such as a smart phone. The communication device 106 may be any of various devices as defined above. FIG. 1B illustrates another example communication device 106B, in this case a desktop computer.

Communication device 106 may include a housing 12, which may be constructed from any of various materials. Communication device 106 may have a display 14, which may, in some cases, be a touch screen that incorporates, e.g., capacitive touch electrodes. Display 14 may be based on any of various display technologies. The communication device 106 may also include various additional input devices such as keyboard 22, as well as other input devices (not shown), such as a mouse, trackpad, remote controller, joystick, microphone, etc. The housing 12 of the communication device 106 may contain or include openings for any of various elements, such as home button 16, speaker port 18, and other elements (not shown), such as a power button, microphone, charging/data port, removable media port, and possibly various other types of buttons, e.g., volume buttons, ringer button, etc.

The communication device 106 may support one or more communication technologies. For example, communication device 106 may be configured to communicate using any of various cellular radio access technologies (RATs). The communication device 106 may also, or alternatively, be configured to support at least one Wireless LAN (WLAN), such as at least one Wi-Fi RAT (e.g., 802.11). Various different or other RATs also may be supported as desired, such as Bluetooth, Bluetooth Low Energy, NFC, etc. The communication device 106 may also, or alternatively, be configured to support at least one wired communication technology, such as Ethernet.

The communication device 106 may be configured to receive a random value from a server, compare the random value to a generated value, and determine, based at least in part on the comparison, whether to transmit an ID query request regarding a peer device over a reverse push connection rather than via a HTTP request, as disclosed herein.

Figure 2:
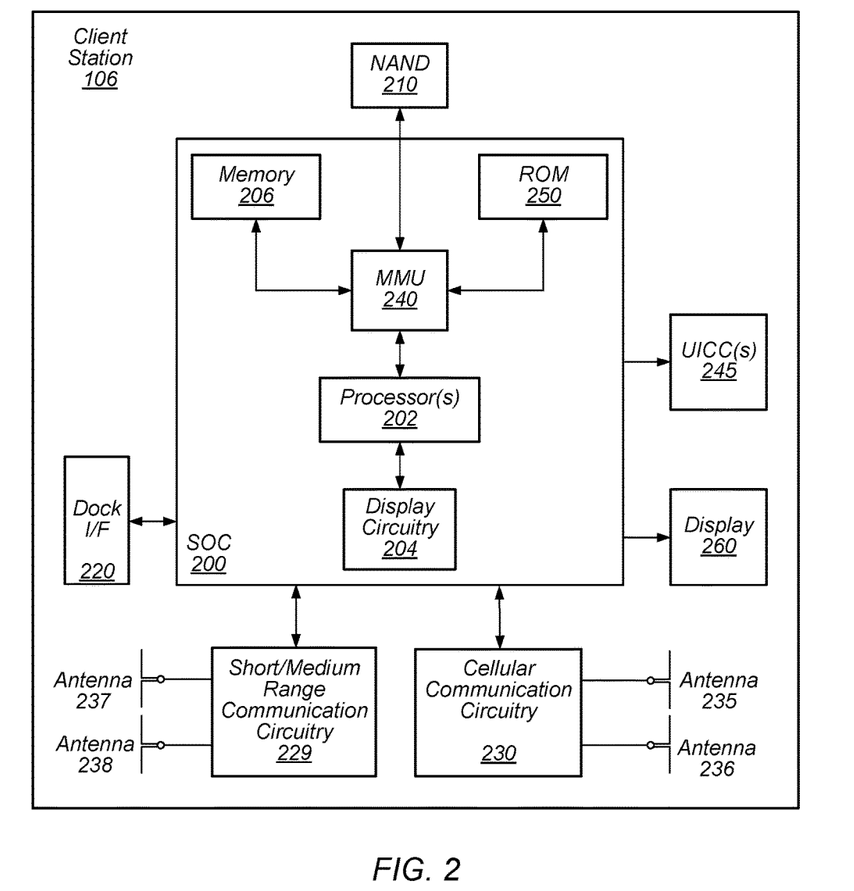
FIG. 2 is an example block diagram of a communication device, according to some embodiments.

FIG. 2—Communication Device Block Diagram

FIG. 2 illustrates an example simplified block diagram of a communication device 106. It is noted that the block diagram of the communication device of FIG. 2 is only one example of a possible client station. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 200 configured to perform core functions. For example, this set of components may be implemented as a system on chip (SOC), which may include portions for various purposes. Alternatively, this set of components 200 may be implemented as separate components or groups of components for the various purposes. The set of components 200 may be coupled (e.g., communicatively; directly or indirectly) to various other circuits of the communication device 106. For example, the communication device 106 may include various types of memory (e.g., including NAND flash 210), an input/output interface such as connector I/F 220 (e.g., for connecting to a computer system; dock; charging station; input devices, such as a microphone, camera, keyboard; output devices, such as speakers; etc.), the display 260, which may be integrated with or external to the communication device 106, and cellular communication circuitry 230 such as for LTE, GSM, etc., and short to medium range wireless communication circuitry 229 (e.g., Bluetooth™ and WLAN circuitry). In some embodiments, communication device 106 may include wired communication circuitry (not shown), such as a network interface card, e.g., for Ethernet.

The cellular communication circuitry 230 may couple (e.g., communicatively; directly or indirectly) to one or more antennas, such as antennas 235 and 236 as shown. The short to medium range wireless communication circuitry 229 may also couple (e.g., communicatively; directly or indirectly) to one or more antennas, such as antennas 237 and 238 as shown. Alternatively, the short to medium range wireless communication circuitry 229 may couple (e.g., communicatively; directly or indirectly) to the antennas 235 and 236 in addition to, or instead of, coupling (e.g., communicatively; directly or indirectly) to the antennas 237 and 238. The short to medium range wireless communication circuitry 229 and/or cellular communication circuitry 230 may include multiple receive chains and/or multiple transmit chains for receiving and/or transmitting multiple spatial streams, such as in a multiple-input multiple output (MIMO) configuration. The communication device 106 may further include one or more smart cards 270 that include SIM (Subscriber Identity Module) functionality, such as one or more UICC(s) (Universal Integrated Circuit Card(s)) cards 270.

As shown, the SOC 200 may include processor(s) 202, which may execute program instructions for the communication device 106 and display circuitry 204, which may perform graphics processing and provide display signals to the display 260. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, communication circuitry 230, connector I/F 220, and/or display 260. The MMU 240 may be configured to perform memory protection and page table translation or set up. In some embodiments, the MMU 240 may be included as a portion of the processor(s) 202.

As noted above, the communication device 106 may be configured to communicate using wireless and/or wired communication circuitry. The communication device 106 may be configured to receive a random value from a server, compare the random value to a generated value, and determine, based at least in part on the comparison, whether to transmit an ID query request regarding a peer device over a reverse push connection rather than via a HTTP request, as disclosed herein.

As described herein, the communication device 106 may include hardware and software components for implementing the above features for establishing and utilizing relayed communication channels, as well as the various other techniques described herein. The processor 202 of the communication device 106 may be configured to implement part or all of the features described herein, e.g., by executing program instructions stored on a memory medium (e.g., a non-transitory computer-readable memory medium). Alternatively (or in addition), processor 202 may be configured as a programmable hardware element, such as an FPGA (Field Programmable Gate Array), or as an ASIC (Application Specific Integrated Circuit). Alternatively (or in addition) the processor 202 of the communication device 106, in conjunction with one or more of the other components 200, 204, 206, 210, 220, 229, 230, 240, 250, 260, 270 may be configured to implement part or all of the features described herein.

In addition, as described herein, processor 202 may include one or more processing elements. Thus, processor 202 may include one or more integrated circuits (ICs) that are configured to perform the functions of processor 202. In addition, each integrated circuit may include circuitry (e.g., first circuitry, second circuitry, etc.) configured to perform the functions of processor(s) 202.

Further, as described herein, cellular communication circuitry 230 and short range wireless communication circuitry 229 may each include one or more processing elements. In other words, one or more processing elements may be included in cellular communication circuitry 230 and also in short range wireless communication circuitry 229. Thus, each of cellular communication circuitry 230 and short range wireless communication circuitry 229 may include one or more integrated circuits (ICs) that are configured to perform the functions of cellular communication circuitry 230 and short range wireless communication circuitry 229, respectively. In addition, each integrated circuit may include circuitry (e.g., first circuitry, second circuitry, etc.) configured to perform the functions of cellular communication circuitry 230 and short range wireless communication circuitry 229.

Figure 3:
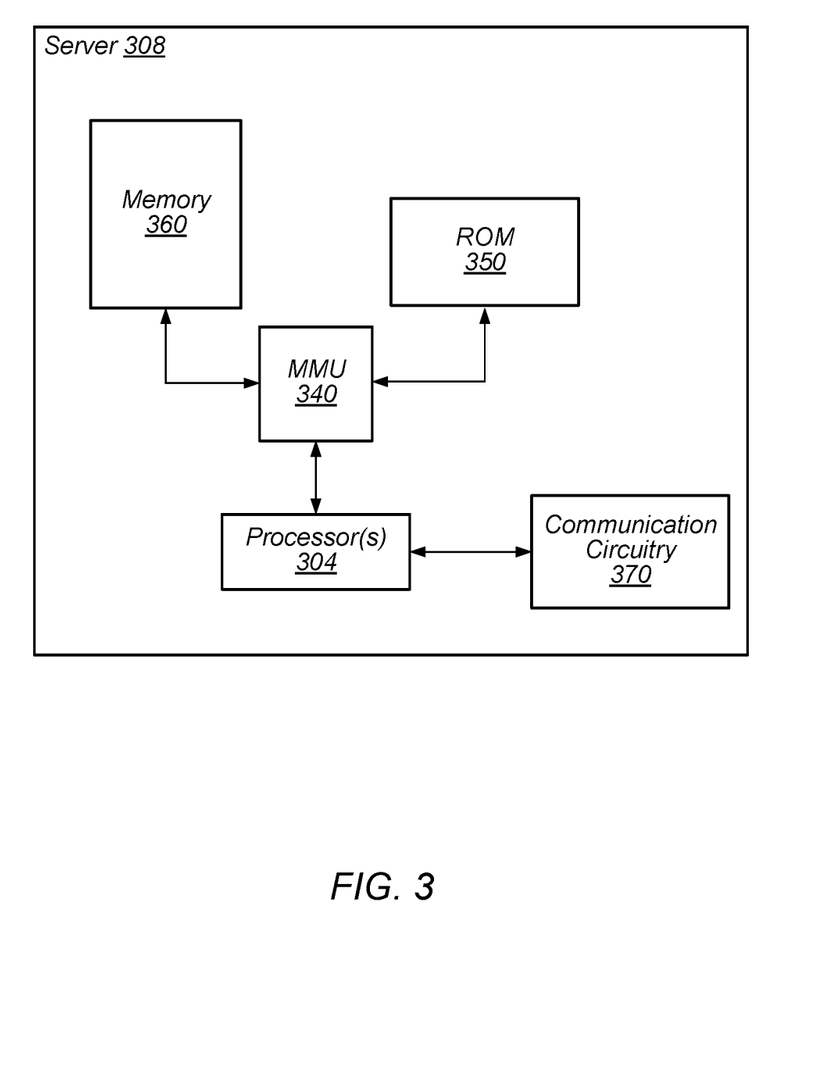
FIG. 3 is an example block diagram of a server, according to some embodiments.

FIG. 3—Server Block Diagram

FIG. 3 illustrates an exemplary block diagram of server 308, according to some embodiments. It is noted that the block diagram of the server of FIG. 3 is one example of a possible system, and other arrangements may be implemented within the scope of the present disclosure. As shown, the server 308 may include processor(s) 304, which may execute program instructions for the server 308. The processor(s) 304 may also be coupled to memory management unit (MMU) 340, which may be configured to receive addresses from the processor(s) 304 and translate those addresses to locations in memory (e.g., memory 360 and/or read only memory (ROM) 350) or to other circuits or devices.

The server 308 may include wired and/or wireless communication circuitry 370. The communication circuitry 370 may include at least one network port or interface providing access to a communication network. For example, the communication circuitry 370 may be configured to communicate over a persistent connection, such as to a push notification server or other message server. As another example, the communication circuitry 370 may be configured to communicate over a traditional IP connection.

As described herein, the server 308 may include hardware and software components for implementing the above features for receiving ID queries via a reverse push connection. The processor 304 of the server 308 may be configured to implement part or all of the features described herein, e.g., by executing program instructions stored on a memory medium (e.g., a non-transitory computer-readable memory medium). Alternatively (or in addition), the processor 304 may be configured as a programmable hardware element, such as an FPGA (Field Programmable Gate Array), or as an ASIC (Application Specific Integrated Circuit). Alternatively (or in addition) the processor 304, in conjunction with one or more of the other components 340, 350, 360, 370 may be configured to implement part or all of the features described herein.

Dual Delivery Channel

In some existing implementations, when a first device attempts to communicate using a service, e.g., such as FaceTime™ or Messages™, with a second device, the first device must know whether the second device is capable of receiving the message via the service. Thus, the first device may perform a query to a server to determine whether the second device is capable of communicating via the service. In other words, the first device may perform a query to the server to determine the capabilities of the second device, e.g., whether the second device is registered for the service and/or whether the second device is currently active. In other words, the capabilities may include information indicating a status of the second device. The query may include asking whether a uniform resource identifier (URI) (e.g., phone number, email address, etc.) is registered for the service. The query may be performed by issuing (sending or transmitting) a hypertext transfer protocol (HTTP) request from the first device to the server. In some situations, such a request may fail or time out due to network conditions that may arise during set up and tear down of a connection with an HTTP endpoint.

Thus, in some embodiments, a first device may perform (e.g., transmit) a query to determine one or more capabilities, e.g., registration and/or status, of a second device to support a service over a reverse push connection socket between the first device and a server connected to the first device (e.g., via a push notification network). In some embodiments, the server may be a push notification server, e.g., such as an Apple Push Notification Service (APNS) server or a cloud messaging server. In some embodiments, the connection socket may be an APNS connection socket or a cloud messaging connection socket. In some embodiments, the query may be included in a message, e.g., an identity (ID) query message.

In some embodiments, a device may generate a service related message. The service related message may include an identifier or identity (ID) query or a request for service registration, among other service related messages. In some embodiments, the service related message may be a de-registration request from a service supported by a server and/or a device listing request that queries the server to determine a list of devices currently signed in to the service for a particular user identity (ID). In still other embodiments, the service related message may correspond to one or more other types of messages relating to, e.g., services, notifications, alerts, and so forth. The device may determine whether to send the service related message via an HTTP request or via a reverse push notification, based on one or more criteria. In other words, in some embodiments, a device may create a service related message, such as an ID query message, and intelligently decide whether the service related message should be transmitted (sent) (i) via an HTTP mechanism or (ii) via a reverse push mechanism.

For example, in some embodiments, an importance level (or priority) may be assigned to the service related message. In some embodiments, the importance level may be based (at least in part) on an affect associate with a user experience of the device, e.g., a user visible aspect resulting from failure of the service related message. As an example, if a first device receives an input to send a message via a messaging service such as Messages (or another messaging service) to a second device and has not previously exchanged messages via the messaging service with the second device, the first device may send a service related message, e.g., an ID query, to a server to determine whether the second device supports the messaging service. Failure of the service related message, e.g., due to network timeout, may result in the first device not using the messaging service to send a message to the second device. Thus, user experience may be impacted (e.g., the first device may send the message via short message service (SMS) instead of the messaging service).

In some embodiments, a higher priority service related message (e.g., such as an ID query message, a service registration request, a service de-registration request, and/or a device listing request, among other service related messages) may be sent via a reverse push notification, whereas a lower priority service related message may be sent via an HTTP request. In some embodiments, a failure of a lower priority query may not affect a user experience (e.g., may not show a negative action to the user or otherwise negatively impact or otherwise impair user experience). Thus, refreshing a known device's capabilities via an ID query message may not result in a negative user experience since the capabilities are already know. For example, if a first device knows a second device is, e.g., reachable through Messages, a refresh of the capabilities of the second device by the first device will not result in a negative user experience since a message to the second device will not fall back to another service, e.g., SMS.

In some embodiments, a server (e.g., such as server 308) may control and/or scale the usage of service related messages via a reverse push mechanism. In some embodiments, the server may send (transmit) a random value to a device. e.g., a value from 0 to 10, 0 to 100, or 0 to 1000, and so forth. The value may be transmitted in a configuration message. The device (or client) may randomly select a value within the range specified by the server and compare the value to the random value received from the server. In some embodiments, to compare the value to the random value received from the server, the device may compare the value to a percentage chance (or percent range) of selecting the value provided by the server. In some embodiments, whether the device uses the reverse push mechanism may be dependent upon a result of the comparison. For example, if the value selected by the device and provided by the server match, the device may use the reverse push mechanism. As another example, if the value selected by the device is within the percentage chance (or range) provided by the server, the device may use the reverse push mechanism. Otherwise, the device may use an HTTP request to send the service related message. Such a scheme may allow a server to control usage of the dual delivery behavior, as well as ramp up usage in certain markets independently, without requiring a client side change.

In some embodiments, if a device transmits a service related message, such an ID query, a service registration request, a service de-registration request, and/or a device listing request, or other service related message(s), via a reverse push connection and a server has allowed the service related message to progress, the server may specify an error code to the device. In some embodiments, receipt of the error code may be an indication to the device to switch the service related message to an HTTP request. In other words, the receipt of the error code may be an indication for the device to resend the service related message via an HTTP request. In some embodiments, the error code may be used in instances in which a response payload may be too large to deliver over the reverse push connection, or in instances in which the server was unable to perform a task specified by the service related message, e.g., an ID query, a service registration, a service de-registration, and so forth, successfully. In some embodiments, a device may determine an error condition based (at least in part) on a timeout of waiting for a response from the server over the push connection. In such instances, the device may resend the service related message via an HTTP request.

Figure 4:
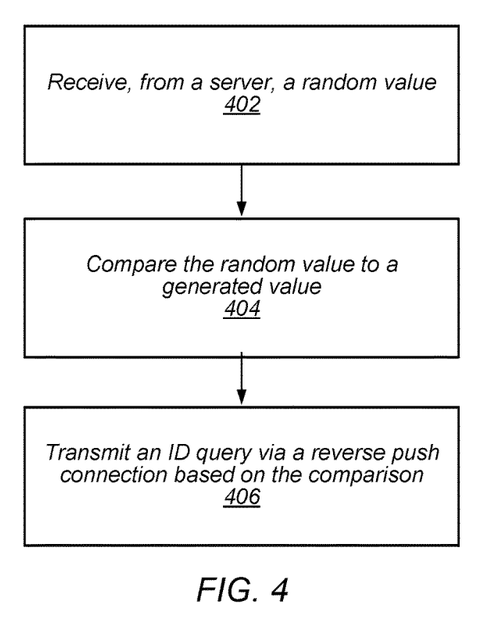
FIG. 4 illustrates a block diagram of an example method for transmission of a query over a reverse push connection, according to some embodiments.

FIG. 4 illustrates a block diagram of an example of a method for transmission of a query over a reverse push connection, according to some embodiments. The method shown in FIG. 4 may be used in conjunction with any of the systems or devices shown in the above Figures, among other devices. In various embodiments, some of the method elements shown may be performed concurrently or in a different order than shown. Further, one or more elements may be omitted and one or more additional method elements may be performed, as desired. As shown, this method may operate as follows.

At 402, a random value may be received (e.g., at or by a communication device 106) from a server (e.g., such as server 308). In some embodiments, the server may be a push notification server, e.g., such as an Apple Push Notification Service (APNS) server or a cloud messaging server. In some embodiments, a random value and/or a percent range (e.g., plus/minus a specified percentage of the random value) associated with the random value may be received. In some embodiments, a range (e.g., plus/minus a specified value of the random value) associated with the random value may be received. In some embodiments, the random value may be received in (or included in) a configuration message. In some embodiments, the configuration message may include any or all of the random value, the associated range, and the associated percent range.

At 404, the random value may be compared to a generated value, e.g., a locally generated value. In some embodiments, the generated value may be generated based, at least in part, on the range associated with the random value.

At 406, based at least in part on the comparison, an identity (ID) query request regarding a peer device may be transmitted (or sent) over a reverse push notification connection instead of via a hypertext transport protocol (HTTP) request. In some embodiments, the comparison may indicate that the random value and the generated value match (e.g., are equivalent or the same), and the ID query (or other service related message) request may be transmitted over the reverse push notification connection based (at least in part) on the values matching. In some embodiments, the comparison may indicate that the random value is within the percentage range (or range) of the random value and the ID query request may be transmitted over the reverse push notification connection based (at least in part) on the generated value being within the percentage range (or range). In some embodiments, transmitting the ID query request may additionally be based (at least in part) on determining that the ID query has a higher priority as compared to other requests, wherein priority is based in part on impact on (or associated with) a user experience. For example, a lower priority may be assigned to a first ID query based in part on a failure of the first ID query not impacting the user experience and a higher priority may be assigned to a second ID query based in part on a failure of the second ID query impacting the user experience.

In some embodiments, a timer may be initiated upon transmission of the ID query via the reverse push connection. In addition, in some embodiments, upon expiration of the timer, the ID query may be transmitted via the HTTP request. Transmission via the HTTP request can be implemented as a fall back in response to a presumption that transmission via the reverse push connection failed.

In some embodiments, an indication that the ID query request has failed may be received (e.g., from the server). In addition, responsive to receipt of the indication, the ID query may be transmitted via the HTTP request. In some embodiments, the indication can include or be represented as an error code.

Figure 5:
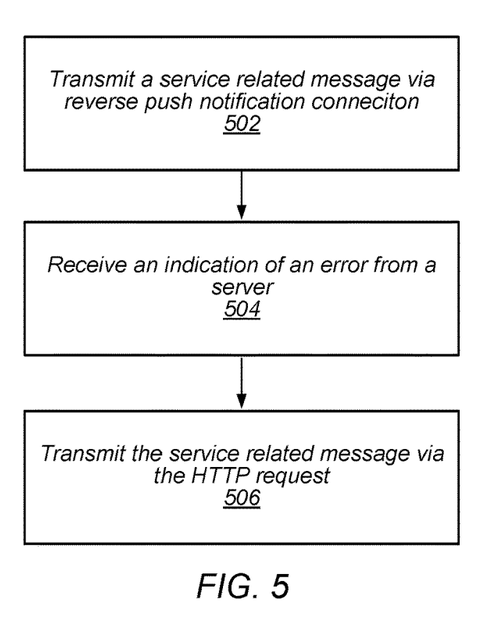
FIG. 5 illustrates a block diagram of an example method for transmitting a service related message, according to some embodiments.

FIG. 5 illustrates a block diagram of an example method for transmitting a service related message, according to some embodiments. The method shown in FIG. 5 may be used in conjunction with any of the systems or devices shown in the above Figures, among other systems or devices. In various embodiments, some of the method elements shown may be performed concurrently or in a different order than shown. Further, one or more elements may be omitted and/or one or more additional method elements may be performed, as desired. As shown, this method may operate as follows.

At 502, a service related message may be transmitted (e.g., by a communication device 106) to a server (e.g., such as server 308) over a reverse push connection rather than (or instead of) via a hypertext transport protocol (HTTP) request. The service related message may be associated with a peer device, e.g., may be a query to determine capabilities (registration and/or status) of the peer device. In some embodiments, the query may be to determine whether the peer device is available (e.g., registered and/or capable of receiving) for communications over a reverse push connection socket (e.g., a push notification network). In some embodiments, the server may be a push notification server, e.g., such as an Apple Push Notification Service (APNS) server or a cloud messaging server. In some embodiments, the connection socket may be an APNS connection socket or a cloud messaging connection socket.

In some embodiments, prior to transmitting the service related message, a random value may be received from the server and compared to a generated local value to determine whether to transmit the service related message via the reverse push notification connection or via the HTTP request. In some embodiments, a percent range associated with the random value may be received. In some embodiments, a range associated with the random value may be received. In some embodiments, the random value may be received in (or included in) a configuration message. In some embodiments, the configuration message may include any or all of the random value, the associated range, and the associated percent range. The random value may be received in a configuration message. In some embodiments, the generated value may be generated based, at least in part, on the range associated with the random value.

At 504, an indication of an error may be received from a sever. The indication of the error may indicate failure of the transmission of the service related message. In some embodiments, the indication may include, or be represented using, an error code.

At 506, the service related message, responsive to receiving the indication of the error, may be transmitted via the HTTP request.

Figure 6:
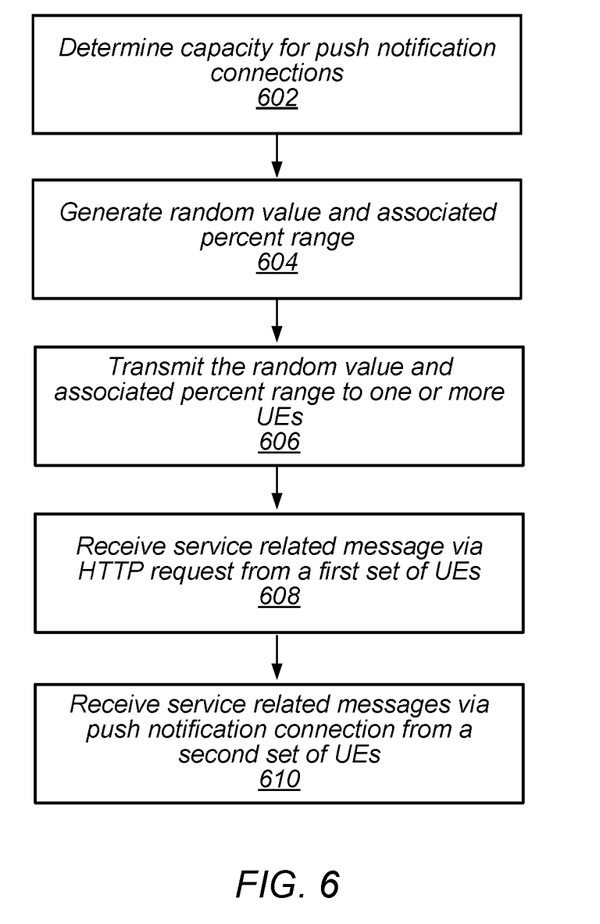
FIG. 6 illustrates a block diagram of an example method for managing reception of queries over a reverse push connection, according to some embodiments.

FIG. 6 illustrates a block diagram of an example method for managing reception of queries over a reverse push connection, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a capacity (e.g., of a server, such as server 308, or a (push notification) network in communication with a server, such as server 308) may be determined for service related messages from one or more (a plurality of) user equipment devices (UEs) (e.g., such as communication devices 106) over one or more respective push notification connections.

At 604, a random value and a percent range associated with the random value may be generated. The percent range may be based at least in part on the capacity. In some embodiments, a range (e.g., 0 to 100, 0 to 1000, 0 to 10,000, and so forth) may be associated with the random value.

At 606, the random value and the percent range may be transmitted to the one or more UEs. In some embodiments, the random value and percent range may be transmitted via (or in) a configuration message. In some embodiments, the associated range may also be transmitted to the one or more UEs.

At 608, service related messages may be received via a hypertext transfer protocol (HTTP) request from a first subset of the one or more UEs.

At 610, service related messages may be received via the push notification connection from a second subset of the one or more UEs.

In some embodiments, a response payload for a service related message received from a first UE of the second subset of UEs may be determined to be too large for the push notification network. In response, an error indication may be transmitted (sent) to the first UE and the service related message may be received from the first UE in an HTTP request. In some embodiments, the error indication may indicate to switch transmission of the service related message from the push notification connection to the HTTP request.

In some embodiments, a failure of a task associated with a service related message received from a first UE of the second subset of UEs may be determined. In response, an error indication may be transmitted to the first UE and the service related message may be received from the first UE in an HTTP request. In some embodiments, the task may include any or all of an ID query, a service registration, a service de-registration, and/or a device listing request, among other tasks.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a communication device or a relay allocation server may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable memory medium storing program instructions executable by a processor to cause operations comprising:
    receiving a random value and a percentage range from a server; comparing the random value to a generated value to determine whether the random value is within the percentage range of the generated value; and determining, based at least in part on the comparison that the random value is within the percentage range of the generated value, to generate instructions to send an identity (ID) query request regarding a peer device over a reverse push connection rather than via a hypertext transport protocol (HTTP) request.

2. The non-transitory computer readable memory medium of claim 1,
    wherein the program instructions are further executable to cause operations comprising:
        initiating a timer upon generation of the instructions to send the ID query; and
        generating, upon expiration of the timer, instructions to send the ID query via the HTTP request.

3. The non-transitory computer readable memory medium of claim 1,
    wherein the program instructions are further executable to cause operations comprising:
        receiving an indication that the ID query request has failed; and
        generating, responsive to receipt of the indication, instructions to send the ID query via the HTTP request.

4. The non-transitory computer readable memory medium of claim 3,
    wherein the indication comprises an error code.

5. The non-transitory computer readable memory medium of claim 1,
    wherein to receive the random value, the program instructions are further executable to cause operations comprising receive a configuration message comprising the random value.

6. The non-transitory computer readable memory medium of claim 1,
    wherein to determine to generate instructions to send an ID query request via the reverse push connection, the program instructions are further executable to cause operations comprising determining that the ID query has a high priority, based at least in part on an impact associated with a user experience.

7. The non-transitory computer readable memory medium of claim 6,
    wherein the program instructions are further executable to cause operations comprising:
        assigning a lower priority to a first ID query based at least in part on determining that a failure of the first ID query will not adversely impact the user experience; and
        assigning a higher priority to a second ID query based at least in part on determining that a failure of the second ID query will adversely impact the user experience.

8. A user equipment device (UE), comprising:
    at least one antenna; at least one radio, wherein the at least one radio is configured to perform cellular communication using at least one radio access technology (RAT);
    one or more processors communicatively coupled to the at least one radio, wherein the one or more processors and the at least one radio are configured to perform voice and/or data communications;
    wherein the one or more processors are configured to:
        determine, based at least in part on a comparison of a random value and a percentage range received from a server to a generated value, whether to transmit a service related message to the server over a reverse push connection or via a hypertext transport protocol (HTTP) request; transmit, via the at least one radio, the service related message to the server over the reverse push connection rather than via the (HTTP request based at least in part on determining that the random value is within the percentage range of the generated value; receive an indication of an error from the server via the at least one radio; and retransmit, responsive to receiving the indication of the error and via the at least one radio, the service related message via the HTTP request.

9. The UE of claim 8,
    wherein the indication of the error comprises an error code.

10. The UE of claim 8,
    wherein to receive the random value from the server, the one or more processors are further configured to receive, via the at least one radio, a configuration message comprising the random value.

11. The UE of claim 8,
    wherein to determine to transmit the service related message via the reverse push connection, the one or more processors are further configured to determine that the service related message has a higher priority, wherein priority is based in part on impact associated with a user experience.

12. The UE of claim 11,
wherein the one or more processors are further configured to:
   assign a lower priority to a first service related message based at least in part on determining that a failure of the first service related message will not impact the user experience; and
   assign a higher priority to a second service related message based at least in part on determining that a failure of the second service related message will impact the user experience.

13. The UE of claim 8,
wherein the indication of the error indicates one or more of:
   a response payload is too large to deliver over the reverse push connection; or
   failure of the server to complete a task associated with the service related message.

14. A server, comprising:
a network interface; and
a processing element operatively coupled to the network interface;
wherein the processing element is configured to: determine a capacity for service related messages from one or more user equipment devices (UEs) over one or more respective push notification connections; generate a random value and a percent range associated with the random value, wherein the percent range is based at least in part on the capacity; transmit the random value and the percent range to the one or more UEs; receive, from a first subset of the one or more UEs, service related messages via hypertext protocol (HTTP) requests, wherein the first subset of the one or more UEs include UEs in which the random value is not within the percent range of a UE generated value; and receive, from a second subset of the one or more UEs, service related messages via the push notification connection, wherein the second subset of the one or more UEs include at least a portion of UEs in which the random value is within the percent range of a UE generated value.

15. The server of claim 14,
wherein the processing element is further configured to:
   determine an error associated with a service related message received from a first UE of the second subset of UEs;
   send an error indication to the first UE; and
   receive, from the first UE, the service related message via an HTTP request.

16. The server of claim 15,
wherein, to determine the error, the processing element is further configured to:
   determine a failure of a task associated with the service related message received from the first UE of the second subset of UEs.

17. The server of claim 15,
wherein, to determine the error, the processing element is further configured to:
   determine that a response payload for the service related message received from the first UE of the second subset of UEs is too large for the push notification network.

18. The server of claim 14,
wherein the second subset of the one or more UEs further include at least a portion of UEs that have assigned a high priority to the service related message.

19. The server of claim 18,
wherein the assignment of the high priority is based at least in part on an impact associated with a user experience.

20. The UE of claim 13,
wherein the task comprises at least one of an identity query, a service registration, or a service de-registration.

* * * * *